United States Patent [19]

Dirck

[11] Patent Number: 4,470,228
[45] Date of Patent: Sep. 11, 1984

[54] PRISONER TRANSPORT MODULE

[76] Inventor: Ronald L. Dirck, P.O. Box 196, Warsaw, Ind. 46580

[21] Appl. No.: 344,391

[22] Filed: Feb. 1, 1982

[51] Int. Cl.³ ............................ B60B 3/00; E04H 3/08
[52] U.S. Cl. .................... 52/106; 296/24 R; 296/164
[58] Field of Search ............... 52/106; 296/164, 24 R, 296/24 C; 119/17

[56] References Cited

U.S. PATENT DOCUMENTS

| | | | |
|---|---|---|---|
| 537,426 | 4/1895 | Brogly | 52/106 |
| 2,219,412 | 10/1940 | Dean | 52/106 V |
| 2,534,492 | 12/1950 | Williams | 119/19 |
| 3,063,414 | 11/1962 | Huber | 119/17 X |
| 3,530,830 | 9/1970 | Smith | 119/15 |
| 3,722,152 | 3/1973 | Schlatter et al. | 52/106 X |
| 4,159,141 | 6/1979 | Dirck | 296/24 R |
| 4,163,577 | 8/1979 | Vanderslice | 296/164 |

FOREIGN PATENT DOCUMENTS 162622  7/1954  United Kingdom ............. 296/24 R

Primary Examiner—Alfred C. Perham
Attorney, Agent, or Firm—James D. Hall

[57] ABSTRACT

A portable prisoner transport module which is easily adaptable to use in any conventional van-type vehicle. The module is a box-like container with a door connected to its rear wall, permitting access into the module. The module may be easily inserted into and removed from a van by two to four men, and may be temporarily secured in the van by removable bolts.

2 Claims, 5 Drawing Figures

PRISONER TRANSPORT MODULE

SUMMARY OF THE INVENTION

This invention relates to a portable prisoner transport module used in combination with a motor vehicle.

Prisoner transports, commonly referred to as brigs, are important in the functioning of law enforcement agencies. They enable police to transport several prisoners from place to place in a single vehicle.

Major problems with conventional brigs are their high cost and limited utility. In a conventional model, the brig is actually built into a vehicle, usually at a high cost, and is not removable from the vehicle, limiting the functions which that vehicle may perform. Such problems are most acute in small communities which have relatively few occasions to use a conventional van brig and which are impeded from purchasing such a van due to its high cost.

This invention serves to provide a van brig of reasonable cost and versatile utility. A lightweight portable brig module or component has been designed which is easily inserted into and removed from a standard van vehicle. When the brig is not in use, the vehicle may be used in its normal capacity. When situations occur where a brig is needed, the brig module may be quickly installed into the vehicle. The brig module can be removed from the van just as rapidly when the need for it is finished. Also, the relatively low cost of the brig module serves to make it more affordable to communities when compared with the more conventional built-in van brigs.

Accordingly, it is an object of this invention to provide a portable brig.

Another object is to provide for a brig which is both economical and simple to use.

Another object is to provide for a brig which may be adapted into any standard van-type vehicle.

Other objects will become apparent upon a reading of the following descriptions.

DESCRIPTION OF THE DRAWINGS

A preferred embodiment of this invention has been chosen for purposes of illustration wherein.

DESCRIPTION OF THE EMBODIMENT

Figure 1:
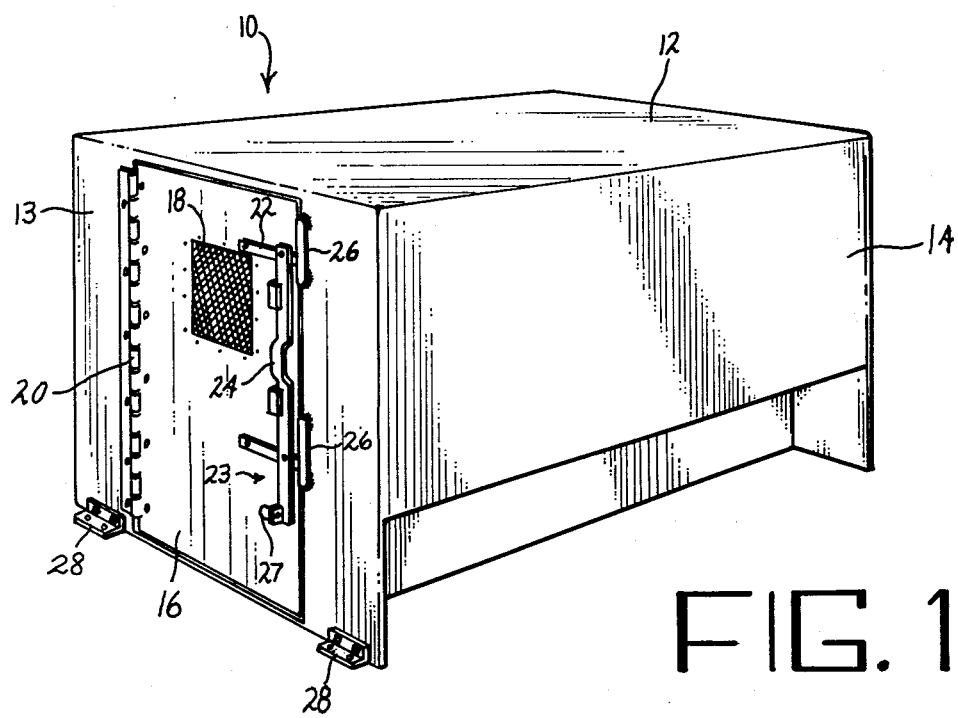
FIG. 1 is a perspective view of the portable prisoner transport module as seen from the rear.
Figure 2:
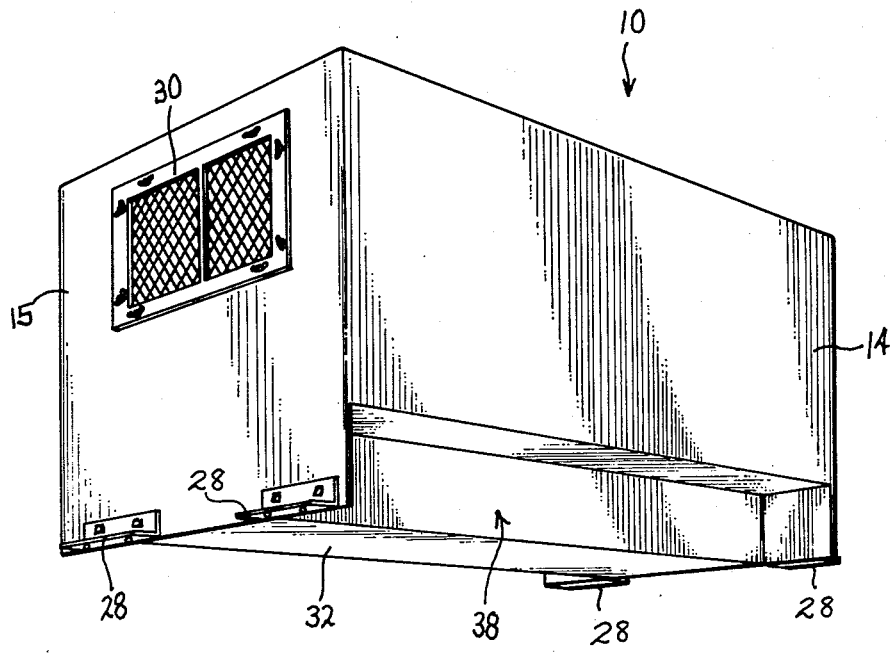
FIG. 2 is a perspective view of the portable prisoner transport module as seen from the front.
Figure 3:
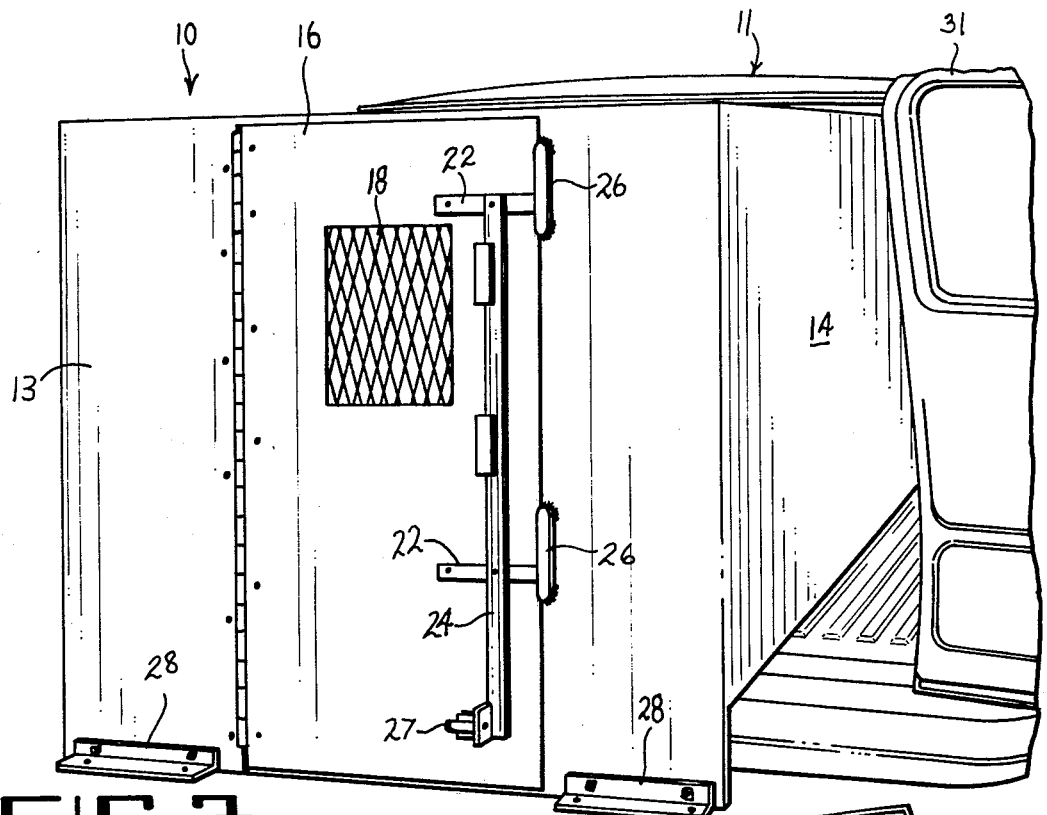
FIG. 3 is a perspective view of the portable prisoner transport module being installed in a van-type vehicle.
Figure 4:
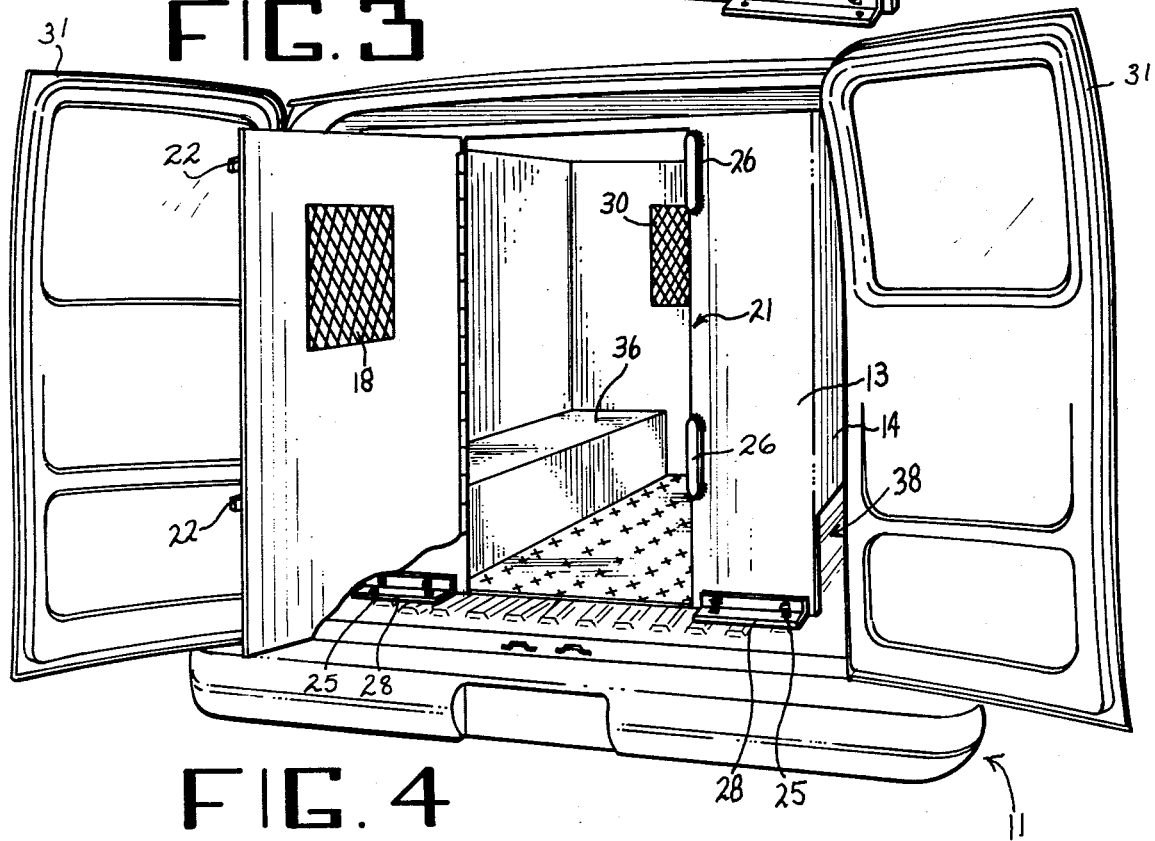
FIG. 4 is a perspective view of the portable prisoner transport module installed in a van with the module door opened and cut away for purposes of illustration.
Figure 5:
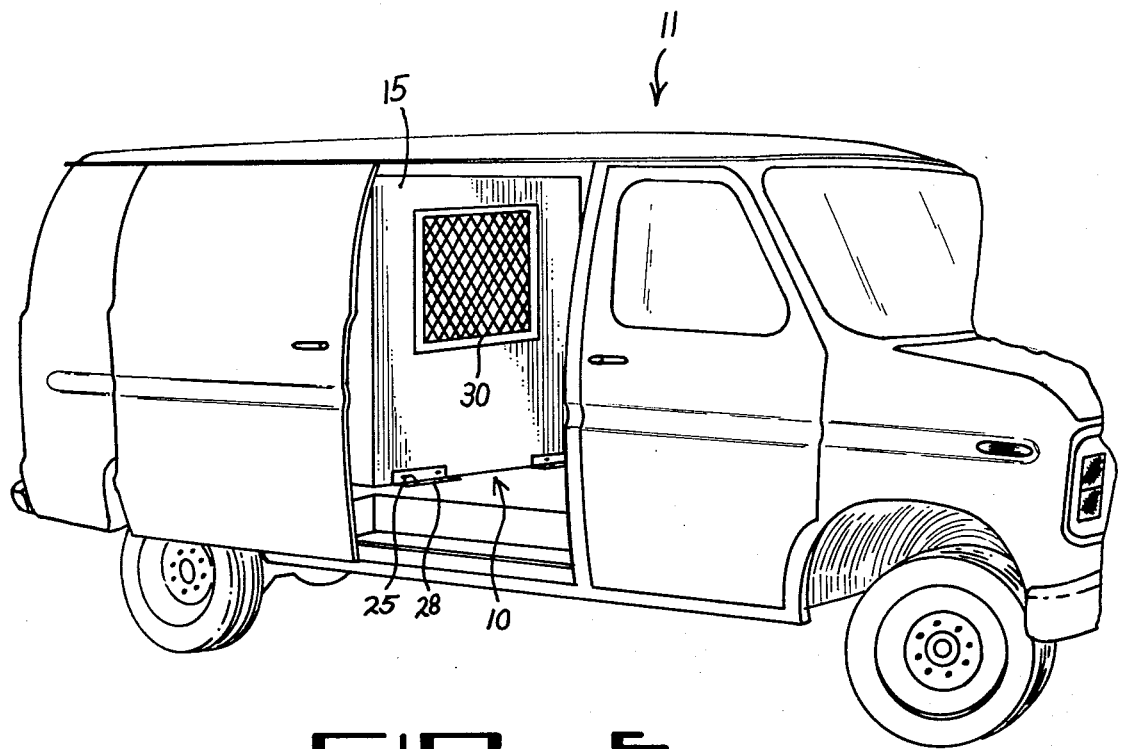
FIG. 5 is a perspective view of the van-type vehicle with the portable prisoner transport module installed and the side door of the vehicle opened.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Portable prisoner transport module 10 is a box-shaped container constructed of lightweight but durable metal defined by a top 12, side walls 14, a rear wall 13, a front wall 15, and a bottom 32. A door 16 is connected to rear wall 13 by hinge parts 20 and spans access opening 21 in the back wall when closed. A wire grating 18 is located over an opening in door 16 to allow ventilation of module 10.

Door 16 is equipped with an exterior latch mechanism 23 to secure the door when closed. The latch mechanism includes a sliding bar 24 which is pivotally connected to latch arms 22 which in turn are pivotally connected to door 16. When arms 22 are fitted behind retaining parts 26 connected to rear wall 13, the door may not be opened from the inside. As further security, a lock 27 is installed on door 16 with its latch pin extending through bar 24 to prevent the bar from sliding open.

Module 10 may be rapidly inserted into the storage compartment of van 11. To prevent the module from shifting within the van, bolts 25 are passed through flange parts 28 connected to the corners of front wall 15 and rear wall 13 and attached to the floor of the van. Module 10 can be easily removed from van 11 when it is no longer needed by removing bolts 25. Two to four men can load and unload empty module 10 from van 11 through its rear doors 31.

Front wall 15 of module 10 includes an opening over which a wire grating 30 is fitted. Grating 30 is removable from the exterior of the module which would allow this opening to serve as an emergency exit should it be necessary. Normally, gratings 30 and 18 provide for flow-through ventilation of the interior of module 10.

Side walls 14 of module 10 include inset lower marginal portions 38 forming benches 36 which prisoners may sit on when confined inside module 10.

It is to be understood that the invention is not to be limited to the details herein given but may be modified within the scope of the appended claims.

What I claim is:

1. A portable prisoner transport module in combination with a vehicle having a storage compartment located therein, said vehicle including at least one access door into said storage compartment, the combination wherein said module is enclosed having a top and a bottom and front and rear walls separated by side walls, said module located removably within said vehicle storage compartment and being fittable through said vehicle access door, at least one of said walls including a lockable door through which prisoners enter and exit said module, each side wall being inset at its lower marginal part to form a bench within said module; said module includes means for releasably securing said module within the storage compartment of said vehicle.

2. The combination of claim 1, wherein said module front wall includes a window means and said module door is located in said rear wall of the module.

* * * * *